United States Patent Office 3,454,684
Patented July 8, 1969

3,454,684
PROCESS FOR THE MANUFACTURE OF NEUTRAL
POLYPHOSPHORIC ESTER ANHYDRIDES
Klaus-Dieter Kampe and Edgar Fischer, Frankfurt
am Main, Germany, assignors to Farbwerke
Hoechst Aktiengesellschaft vormals Meister
Lucius & Bruning, Frankfurt am Main, Germany, a corporation of Germany
No Drawing. Filed Oct. 23, 1965, Ser. No. 504,186
Claims priority, application Germany, Oct. 28, 1964
F 44,325
Int. Cl. C07f 9/08; C07d 105/02
U.S. Cl. 260—988                                    5 Claims

ABSTRACT OF THE DISCLOSURE

A process has been provided for the manufacture of neutral polyphosphoric ester anhydrides, which comprises reacting with phosphorus pentoxide at temperatures within the range of from $-78°$ to $+140°$ C. a phosphorus compound or a mixture of phosphorus compounds of the formula $$(R')_m P(OR)_n$$

wherein $n$ represents the whole number 1 or 3 and $m$ represents the whole number 0 or 2 and the sum of $n+m$ is 3, R' represents saturated, oxalkylated or halogenated aliphatic, cycloaliphatic or aromatic radicals each containing 1 to 10 carbon atoms, and R represents saturated and halogenated aliphatic radicals each containing 1 to 5 carbon atoms. The compounds are catalysts in proton-catalyzed reactions.

---

The present invention relates to a process for the manufacture of neutral polyphosphoric ester anhydrides.

It is known that neutral polyphosphoric acid esters can be prepared by reacting alkyl esters or aryl esters of phosphoric acid with phosphorus pentoxide whereby oleaginous compounds are formed which cannot be distilled. It is disadvantageous that the unreacted starting products can be separated from the reaction product only with difficulty and at elevated temperature. At temperatures above 120° C. neutral polyphosphoric acid esters, with the exception of methyl esters, commence to decompose. Consequently, this process is not very well suited for the preparation of polyphosphoric acid esters which are free from phosphate, phosphorus or polyphosphoric acid. It is, moreover, known that polyphosphoric acid esters, that is to say tetrameric cyclic polyphosphoric acid esters, are formed in the reaction of phosphorus pentoxide with diethyl ether in chloroform. It is true that a defined mixture of two known compounds is formed when using this method, however, relatively long periods of time are necessary for the conversion, which is inconvenient especially when preparing large amounts of this polyphosphoric acid ester.

This reaction, moreover, depends to a great extent on the quality of the phosphorus pentoxide. Only certain batches thereof can be used for the preparation of active colorless polyphosphoric acid esters.

Now we have found that neutral polyphosphoric ester anhydrides can be prepared advantageously by reacting phosphorus compounds or mixtures of phosphorus compounds of the formula $$(R')_m P(OR)_n$$

wherein $n$ represents the whole number 1 or 3 and $m$ represents the whole number 0 or 2 and the sum of $m+n$ is 3, R' represents saturated, oxalkylated or halogenated aliphatic, cycloaliphatic or aromatic radicals each containing 1 to 10 carbon atoms, and R represents saturated and halogenated aliphatic radicals each containing 1 to 5 carbon atoms, with phosphorus pentoxide, if necessary in the presence of a solvent, at a temperature within the range of from $-78°$ to $+140°$ C.

Suitable phosphorus compounds are, for example $$(R')_2 POR$$

and $$P(OR)_3$$

wherein R and R' have the above meaning. The oxalkylated aliphatic radicals are preferably methoxy-, ethoxy-, propoxy- and butoxyalkyl radicals, while the halogenated aliphatic radicals are monohalogenated alkyls.

Epsecially suitable phosphorus compounds are, for example, tertiary phosphites of the formula $$P(OR)_3$$

wherein R and R' represent methyl- or ethyl groups, or mixtures of these compounds.

The phosphorus compounds are added, either in a pure state or in the presence of one of the solvents enumerated below, to pure phosphorus pentoxide or to mixtures thereof with the solvents enumerated below at a temperature within the range of from $-78°$ to $+140°$ C., preferably within the range of from $-30°$ to $+100°$ C., advantageously in an atmosphere of inert gas, for example nitrogen, and with almost complete exclusion of moisture. The reaction mixtures prepared in this manner are stirred or thoroughly mixed within the limits of the aforementioned temperature range.

The reaction periods may vary from 10 minutes to 24 hours and are different as regards the individual phosphorus compounds. The phosphorus compounds are suitably applied in a molar ratio within the range of from 0.01 to 20 moles (preferably in the molar quantities indicated in the table hereunder) per mole of phosphorus pentoxide. The first column of the table contains the respective type of compound of the phosphorus compound, in which case the above-mentioned radicals may represent R and R'. In the second column there is listed the range of the molar quantities of the phosphorus compounds, in which range the phosphorus compound is reacted, for example, with one mole of phosphorus pentoxide.

Table

| Type of compound of the phosphorus compound: | Range of the molar quantities phosphorus compound/ mole $P_2O_5$, moles |
|---|---|
| $(R')_2POR$ | 0.2–9 |
| $P(OR)_3$ | 0.02–5 |

As solvents there may be used halogenated hydrocarbons boiling within the range of from 30° to 120° C. chloroform, methylene chloride and 1,1,1-trichloroethane may be used with special advantage. However, the reaction may also be carried out in the presence of, for example, carbon tetrachloride, methylene bromide, symmetric and asymmetric dichloroethane, 1,1,2-trichloroethane, trichloroethylene, tetrachloroethylene, trifluorotrichloroethane and symmetric difluorotetrachloroethane and in mixtures thereof. The solvents are advantageously used in an anhydrous and non-alcoholic state in amounts ranging from 1 to 300 parts by weight, preferably 7 to 50 parts by weight, per part by weight of phosphorus pentoxide. It is advantageous to carry out the reaction and the work-up with the almost complete exclusion of moisture.

The polyphosphoric ester anhydrides formed are present after the reaction either in the dissolved state or, if the reaction is carried out without a solvent, in the form of viscous oils intermingled with unreacted basic products. In the latter case it is advantageous to dissolve these oils by the addition of a solvent since solutions can be worked up especially well. The solutions can be separated from the solid substance by filtering off with suction and freed from the solvent and unreacted basic phosphorus compounds in vacuo or in the high vacuum at a bath temperature below 110° C. It is, moreover, possible to precipitate the dissolved polyphosphoric ester anhydrides by adding a liquid precipitating agent. The supernatant solvent containing the unreacted basic products and other impurities is decanted. This process of dissolution and precipitation may be repeated as often as desired. In this manner, undesirable impurities can be removed almost quantitatively from the polyphosphoric ester anhydrides. As precipitating agents there are suited especially low molecular weight alkanes and cycloalkanes containing 5 to 12 carbon atoms which are liquid at room temperature; there are mentioned hexane, heptane, octane and cyclohexane. Aliphatic and cyclic ethers, for example diethyl ether, tetrahydrofurane, glycol dimethyl ether, dioxane and benzene are well suited as precipitating agents. The basic phosphorus compounds are in general sufficiently soluble in the organic solvents used as precipitating agents and are highly soluble in the solvent mixtures comprising halohydrocarbons and precipitating agents, which are formed in the precipitating process. The precipitation of dissolved polyphosphoric ester anhydrides can also be used for fractionating the products by precipitating fractions with different degrees of solubility one after the other by adding different amounts of precipitating agents. Fractions that are obtained in this manner differ from one another in respect of their catalytic activity. In this process the polyphosphoric ester anhydrides are obtained in the form of colorless to yellowish viscous oils which cannot be distilled.

The polyphosphoric ester anhydrides are mixed anhydrides of partially hydrolized polyphosphoric acid esters with partially or completely hydrolized phosphorus compounds corresponding to the above formula. In these mixed anhydrides there is present a mixture of open-chain, cyclic and combined open-chain/cyclic molecules with polyphosphate units which contain, statistically distributed, phosphite groups and/or $(R')_2P$—O groups in a partially and/or completely anhydrous form. The extent to which such groupings are contained in the products depends primarily on the molar ratio in which the basic products were reacted with one another, however, it is also influenced by the reactivity of the phosphorus compound with respect to phosphorus pentoxide. The phosphite phosphorus atom in the mixed polyphosphoric ester anhydrides can either be bonded to the polyphosphate unit through all its single bonded oxygen functions or only through part of them. In the latter case the residual P—OR groupings are preserved.

In Scheme 1 following hereunder there are shown, in a skeleton general formula, two of many possible molecule sections of polyphosphoric ester anhydrides formed in the reaction of tertiary phosphites with $P_2O_5$. Scheme 2 shows, in a skeleton general formula, a section of one of the many reaction products that may be formed in the reaction of phosphinous acid esters with $P_2O_5$. R and R' have the above meaning in Schemes 1 and 2.

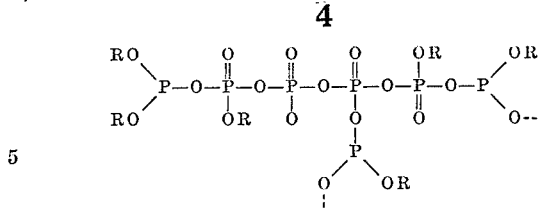

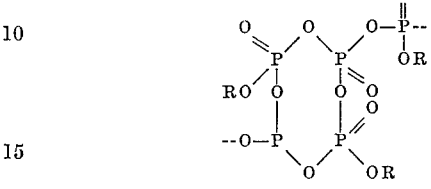

Scheme 1

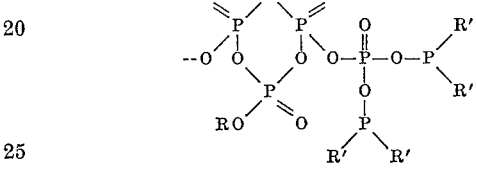

Scheme 2

The elementary composition of the polyphosphoric ester anhydrides depends on the molar ratio in which the basic components are applied, however, it depends also on the degree of conversion. Consequently, definite limits cannot be given with respect to the analytical composition of the polyphosphoric ester anhydrides that can be obtained by the process of the present invention.

As compared to the known polyphosphoric acid esters, the polyphosphoric ester anhydrides obtained according to the present invention exhibit an increased catalytic activity when used, instead of acids or Lewis acids, as catalysts in proton-catalyzed reactions. The trialkyl phosphites, especially trimethyl- and triethyl phosphite, are substantially more reactive in the reaction with phosphorus pentoxide than the corresponding phosphoric acid esters. The reaction proceeds even in the case of low temperatures ($<-10°$ C.) with great rapidity thus enabling the preparation of especially pure polyphosphoric ester anhydrides. Moreover, the boiling points of the phosphites which are considerably lower than those of the corresponding phosphoric acid esters enable the removal of minor portions of unreacted phosphite in vacuo at relatively low temperatures. The catalytic activity of the polyphosphoric ester anhydrides prepared with short-chain trialkyl phosphites is somewhat greater than that of the most active products obtainable from ether and phosphorus pentoxide, and the catalytic activity is substantially greater than that obtained with reaction products from phosphates and phosphorus pentoxide.

The polyphosphoric ester anhydrides are used as catalysts in proton-catalyzed reactions, for example in biochemical polycondensation reactions or polymerization reactions in the polyacetal field. They are, moreover, useful as intermediate products in the manufacture of insecticides.

The following examples serve to illustrate the invention but they are not intended to limit it thereto:

EXAMPLE 1

1.82 grams (11 mmoles) of triethyl phosphite were added, under nitrogen and with the exclusion of moisture, to a mixture comprising 1.56 grams (11 mmoles) of phosphorus pentoxide and 10 ml. chloroform, the temperature of the mixture having been adjusted at −20° C., and the whole was shaken. After 3 minutes, the reaction mixture was allowed to warm up to room temperature and shaken again for 10 minutes. Then about 50% of the chloroform was distilled in vacuo and 50 ml. heptane were added to the remaining concentrated solution under nitrogen, in which process an oil precipitated. The supernatant solution was decanted, and the oil was shaken twice with 100 ml., respectively, of a mixture comprising 20 ml. methylene chloride and 80 ml. heptane, and allowed to deposit while the supernatant solution was decanted in each case. The remaining colorless oil was freed from solvent residues in vacuo. The oil had the following composition (in percent: P, 26.8; C, 23.5; H, 5.0.

EXAMPLE 2

9.60 grams (58 mmoles) of triethyl phosphite were added, while stirring and cooling with ice water, to a mixture comprising 2.40 grams (16.9 mmoles) phosphorus pentoxide and 3 ml. methylene chloride, the temperature of said mixture having been adjusted at 0° C. The phosphorus pentoxide dissolved in a few minutes. After 30 minutes the reaction mixture was warmed up to 30° C. and stirred again for one hour. The reaction mixture was then heated to constant weight in vacuo (0.1 mm. Hg pressure) at a bath temperature of 50° C. There remained a colorless oil (5.6 grams).

EXAMPLE 3

A solution of 25 grams trimethyl phosphite in 100 ml. methylene chloride was added dropwise, with agitation, under nitrogen and with the exclusion of moisture, to a mixture comprising 142 grams phosphorus pentoxide and 300 ml. methylene chloride. After the phosphite had been added, the temperature was allowed to rise to 20° C. and the reaction mixture was stirred for 35 hours. The solution was separated from undissolved portions, 300 ml. methylene chloride were again added to the solid residue and the whole was stirred for 24 hours. The solution was again separated and combined with the methylene chloride solution which had been separated previously. The combined methylene chloride solutions were concentrated to constant weight in vacuo at a bath temperature of 18° to 22° C. There remained 74 grams of a highly viscous, almost colorless oil. The oil had the following composition (in percent): P, 37.5; C, 10.1; H, 2.5.

EXAMPLE 4

5.7 grams (30 mmoles) of dibutyl phosphinous acid ethyl ester [$(C_4H_9)_2POC_2H_5$], dissolved in 10 ml. 1,1,1-trichlorethane, were added, under nitrogen and at room temperature, to a mixture comprising 3.2 grams (22.5 mmoles) of phosphorus pentoxide and 10 ml. 1,1,1-trichlorethane. The reaction mixture warmed up slightly. The mixture was shaken overnight at room temperature and the solution was then filtered off with suction from the solid substance. The solution was concentrated to constant weight at 0.1 mm. Hg pressure at a bath temperature of 80° C. 6.1 grams of a viscous oil of a yellow-brown color were obtained which had the following elementary composition (in percent): P, 22.1; C, 44.3; H, 8.8.

We claim:

1. A process for the manufacture of neutral polyphosphoric ester anhydrides, which comprises reacting with phosphorus pentoxide at temperatures within the range of from −78° to +140° C. a phosphorus compound or a mixture of phosphorus compounds of the formula $$(R')_mP(OR)_n$$

wherein $n$ represents the whole number 1 or 3 and $m$ represents the whole number 0 or 2 and the sum of $n+m$ is 3, R′ represents a saturated, oxalkylated or chlorinated aliphatic radical each containing 1 to 10 carbon atoms, and R represents a saturated and chlorinated aliphatic radical each containing 1 to 5 carbon atoms.

2. The process as claimed in claim 1, wherein the reaction is carried out in the presence of diluents and solvents at temperatures within the range of −30° to 100° C.

3. The process as claimed in claim 1, wherein the phosphorus compounds mentioned in claim 1 are applied in a molar ratio within the range of from 0.02 to 9 moles per mole of phosphorus pentoxide.

4. The process as claimed in claim 1, wherein trimethyl-, triethyl-, tri-n-propyl or tri-n-butyl-phosphite or mixtures of these compounds are reacted with phosphorus pentoxide.

5. The process as claimed in claim 1, wherein the phosphorus compound is reacted in a molar ratio within the range of from 0.01 to 20 moles per mole of phosphorus pentoxide.

References Cited

UNITED STATES PATENTS 2,402,703   6/1946   Woodstock _____ 260—988

CHARLES B. PARKER, *Primary Examiner.*

A. H. SUTTO, *Assistant Examiner.*

U.S. Cl. X.R.

260—927, 933